US006288497B1

(12) United States Patent
Chang et al.

(10) Patent No.: US 6,288,497 B1
(45) Date of Patent: Sep. 11, 2001

(54) MATRIX STRUCTURE BASED LED ARRAY FOR ILLUMINATION

(75) Inventors: Chin Chang; Shaomin Peng, both of Yorktown Heights, NY (US)

(73) Assignee: Philips Electronics North America Corporation, New York, NY (US)

( * ) Notice: Subject to any disclaimer, the term of this patent is extended or adjusted under 35 U.S.C. 154(b) by 0 days.

(21) Appl. No.: 09/534,210

(22) Filed: Mar. 24, 2000

(51) Int. Cl.[7] .................... B60Q 1/02

(52) U.S. Cl. .................... 315/185 R; 315/191; 315/192; 362/800

(58) Field of Search .................... 315/185 R, 192, 315/191; 362/800, 812

(56) References Cited

U.S. PATENT DOCUMENTS 4,868,719 9/1989 Kouchi et al. .................... 362/61
5,726,535 * 3/1998 Yan .................... 315/185 R

FOREIGN PATENT DOCUMENTS 2131589 6/1984 (GB) .

OTHER PUBLICATIONS

"The Fundamental Theorem For A Discrete Channel With Noise", C.E. Shannon, Bell System Technical Journal, vol. 27, pp. 379–423, Jul., 1948 (Reprint pp. 14–18).

* cited by examiner

*Primary Examiner*—David Vu
(74) *Attorney, Agent, or Firm*—Edward W. Goodman

(57) ABSTRACT

A matrix structure-based light-emitting diode array includes a plurality of input resistances connected in parallel to one terminal of a current source, and a plurality of output resistances connected in parallel to another terminal of a current source. Light-emitting diodes are then used to connect each of the input resistances to each of the output resistances. Arranged as such, no two light-emitting diodes is connected in parallel and, as such, the failure of any one light-emitting diode does not extinguish any of the other light-emitting diodes.

11 Claims, 5 Drawing Sheets

MATRIX STRUCTURE BASED LED ARRAY FOR ILLUMINATION

BACKGROUND OF THE INVENTION

1. Field of The Invention

The subject invention relates to lighting systems, and more particularly, to an improved array structure for light-emitting diodes used as illumination sources.

A light-emitting diode (LED) is a type of semiconductor device, specifically a p-n junction, which emits electromagnetic radiation upon the introduction of current thereto. Typically, a light-emitting diode comprises a semiconducting material that is a suitably chosen gallium-arsenic-phosphorus compound. By varying the ratio of phosphorus to arsenic, the wavelength of the light emitted by a light-emitting diode can be adjusted.

With the advancement of semiconductor materials and optics technology, light-emitting diodes are increasingly being used for illumination purposes. For instance, high brightness light-emitting diodes, based on Aluminum Indium Gallium Phosphide and Indium Gallium Nitride technologies, are currently being used in automotive signals, traffic lights and signs, large area displays, etc.

2. Description Of The Related Art

In many of the above-noted applications, multiple light-emitting diodes are connected in an array structure so as to produce a high amount of lumens. FIG. 1 illustrates a typical arrangement of light-emitting diodes D(1)–D(n) connected in series. A power source 1 deliver a current signal to the light-emitting diodes via a resistor R1, which controls the flow of current in the diodes. Light-emitting diodes which are connected in this fashion usually lead to a power supply with a high level of efficiency and a low amount of thermal stress.

Occasionally, an LED may fail. The failure of an LED may be either an open-circuit failure or a short-circuit failure. For instance, in short-circuit failure mode, light-emitting diode D(2) acts as a short-circuit, allowing current to travel from light-emitting diode D(1) to D(3) through light-emitting diode D(2) (which does not generate light). On the other hand, in open-circuit failure mode, light-emitting diode D(2) acts as an open circuit, and, as such, causes the entire array of FIG. 1 to extinguish.

In order to address this situation, other arrangements of light-emitting diodes have been proposed. For example, FIG. 2A illustrates another typical arrangement of light-emitting diodes which consists of multiple branches of light-emitting diodes 10, 12, 14 and 16, connected in parallel. Each branch comprises light-emitting diodes connected in series as in FIG. 1. In FIG. 2A, branch 10 comprises light-emitting diodes D1(1) to D1(n), connected in series; branch 12 comprises light-emitting diodes D2(1) to D2(n); branch 14 comprises light-emitting diodes D3(1) to D3(n); and branch 16 comprises light-emitting diodes D4(1) to D4(n). Power source 2 provides a current signal to the branches 10, 12, 14 and 16 via a resistor R2.

Light-emitting diodes which are connected in this fashion have a higher level of reliability than light-emitting diodes which are connected according to the arrangement shown in FIG. 1. In open-circuit failure mode, the failure of a light-emitting diode in one branch causes all of the light-emitting diodes in that branch to extinguish, without significantly affecting the light-emitting diodes in the remaining branches. However, the fact that all of the light-emitting diodes in a particular branch are extinguished by an open-circuit failure of a single light-emitting diode is still an undesirable result. In short-circuit failure mode, the failure of a light-emitting diode in a first branch may cause that branch to have a higher current flow, as compared to the other branches. The increased current flow through a single branch may cause the remaining light-emitting diodes to luminesce at a different level than the light-emitting diodes in the remaining branches. This is also an undesirable result.

Still other arrangements of light-emitting diodes have been proposed in order to remedy this problem. For example, FIG. 2B illustrates another typical arrangement of light-emitting diodes, as employed by lighting systems of the prior art. The arrangement of FIG. 2B is substantially similar to that of FIG. 2A, with the exception that shunts are connected between adjacent branches of light-emitting diodes. In particular, shunt 4 is arranged between the light-emitting diodes D1(1)/D1(2), D2(1)/D2(2), D3(1)/D3(2) and D4(1)/D4(2) and connects the branches 10, 12, 14 and 16 to each other. Shunts 5 and 6 are similarly arranged between respective light-emitting diodes in the branches 10, 12, 14 and 16, and connect the branches to each other.

Light-emitting diodes which are connected in this fashion have a still higher level of reliability than light-emitting diodes which are connected according to the arrangements shown in either FIGS. 1 or 2A. This follows because, in an open-circuit failure mode, an entire branch does not extinguish because of the failure of a single light-emitting diode in that branch. Instead, current flows via the shunts to bypass the failed light-emitting diode.

However, in the short-circuit failure mode, a light-emitting diode which fails has no voltage across it, thereby causing all of the current to flow through the branch having the failed light-emitting diode. For example, if light-emitting diode D1(1) short circuits, current will flow through the upper branch. Thus, in the arrangement shown in FIG. 2B, when a single light-emitting diode short circuits, the corresponding light-emitting diodes D2(1), D3(1) and D4(1) in each of the other branches will also be extinguished.

The arrangement shown in FIG. 2B also experiences other problems. For example, in order to ensure that all of the light-emitting diodes in the arrangement have the same brightness, the arrangement requires that parallel-connected light-emitting diodes have matched forward voltage characteristics. For example, light-emitting diodes D1(1), D2(1), D3(1) and D4(1), which are parallel connected, must have tightly matched forward voltage characteristics. Otherwise, the current signal flow through the light-emitting diodes will vary, resulting in the light-emitting diodes having dissimilar brightness.

In order to avoid this problem of varying brightness, the forward voltage characteristics of each light-emitting diode must be tested prior to its usage. In addition, sets of light-emitting diodes with similar voltage characteristics must be culled into tightly grouped sets (i.e., sets of light-emitting diodes for which the forward voltage characteristics are nearly identical). The tightly grouped sets of light-emitting diodes must then be installed in a light-emitting diode arrangement in parallel to each other. This culling process is costly, time consuming and inefficient

SUMMARY OF THE INVENTION

An object of the subject invention is to provide an improved light-emitting diode array in which in the event of a failure of one of the light-emitting diodes, the remaining light-emitting diodes stay illuminated.

A further object of the subject invention is to provide an improved light-emitting diode array in which the characteristics of the light-emitting diodes do not need to be tightly matched.

The above objects are achieved in a matrix structure based light-emitting diode array for illumination comprising an input terminal coupled to a first terminal of a power source for receiving a current signal; an output terminal coupled to a second terminal of said current source; a plurality of input current regulating elements coupled in parallel to said input terminal; a plurality of output current regulating elements coupled in parallel to said output terminal; and a plurality of light-emitting diodes connecting each input current regulating element to each output current regulating element, whereby none of the light-emitting diodes are connected in parallel.

Co-pending U.S. patent application Ser. No. 09/431,584, filed Nov. 1, 1999, assigned to the Assignee of the subject application, discloses a lattice structure-based LED array for illumination which solves this problem. In particular, as shown in FIG. 3A, the lighting system includes a power source 3 for driving a current signal through a pair of parallel disposed, electrically conductive branches 20 and 22, each branch containing a plurality of serially connected light-emitting diodes D1(1)–D1(n) and D2(1)–D2(n). In each branch, the anode terminal of each light-emitting diode is coupled to the cathode terminal of a corresponding light-emitting diode in an adjacent branch via a shunt comprising another light-emitting diode (DS1(1)–DS1(n), DS2(1)–DS2 (n)). This arrangement allows the use of light-emitting diodes having different forward voltage characteristics, while still insuring that all of the light-emitting diodes have substantially the same brightness. In the event of failure of one light-emitting diode in a branch, the remaining light-emitting diodes in that branch are not extinguished. FIG. 3B shows the above arrangement extended to a plurality of parallel branches (20, 22 and 24).

Applicants have found that this arrangement may be extended to a more generalized structure. In an article appearing in the Bell System Technical Journal, Vol. 27, pages 379–423, July, 1948, C. E. Shannon disclosed a channel model in information theory, shown in FIG. 4A in which input sequences are points on the left and output sequences are points on the right. The fan of cross lines represents the range of possible causes for a typical output. Applicants have found that this channel model may be used for a light-emitting diode array, in which light-emitting diodes replace the lines in FIG. 4A, as shown in FIG. 4B. Arranged as such, no two light-emitting diodes are in parallel with each other and, as such, the failure of any one of the light-emitting diodes, either by a short or open circuit, does not affect the operability of the remaining light emitting diodes.

BRIEF DESCRIPTION OF THE DRAWINGS

With the above and additional objects and advantages in mind as will hereinafter appear, the invention will be described with reference to the accompanying drawings, in which:

FIG. 2A shows a known serial/parallel arrangement of light-emitting diodes, while

FIG. 3A shows a lattice arrangement of light-emitting diodes with cross-shunting light-emitting diodes connecting the two branches, while

FIG. 4A shows the schematic representation of the relations between inputs and outputs in a channel, while

DESCRIPTION OF THE PREFERRED EMBODIMENTS

Figure 5:
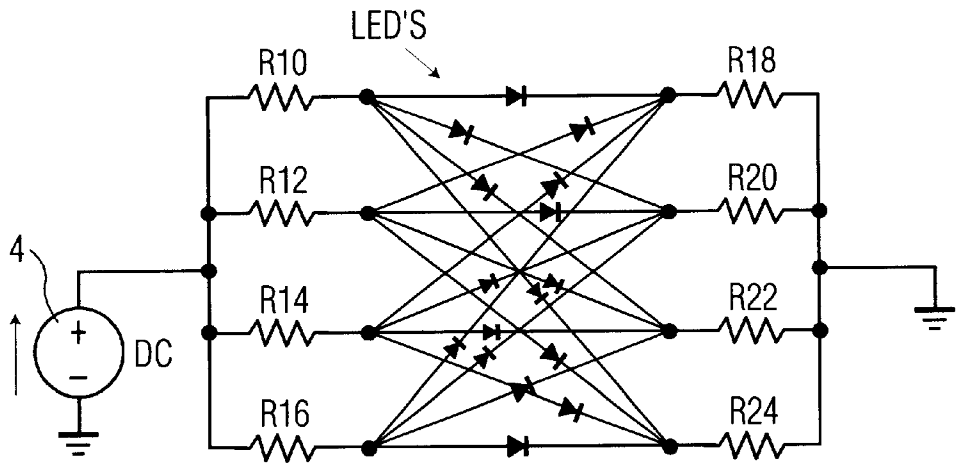
FIG. 5 shows a first embodiment of the subject invention in which the number of input nodes equals the number of output nodes.

FIG. 5 shows a first embodiment of a matrix structure based light-emitting diode array in which a power source 4 provides a current signal to a light-emitting diode array. In particular, resistors R10, R12, R14 and R16 are connected in parallel to the power source 4. At the other side of the light-emitting diode array, resistors R18, R20, R22 and R24 are connected in parallel to a ground connection. Light-emitting diodes LED's are then used to connect each of the resistors R10, R12, R14 and R16 to each of the resistors R18, R20, R22 and R24. As should be apparent when viewing FIG. 5, due to the inclusion of the input and output resistors, no two light-emitting diodes is connected in parallel. Hence, when any one of the light-emitting diodes fails, either in a short circuit or open circuit mode, all of the other light-emitting diodes remain lit.

Figure 1:
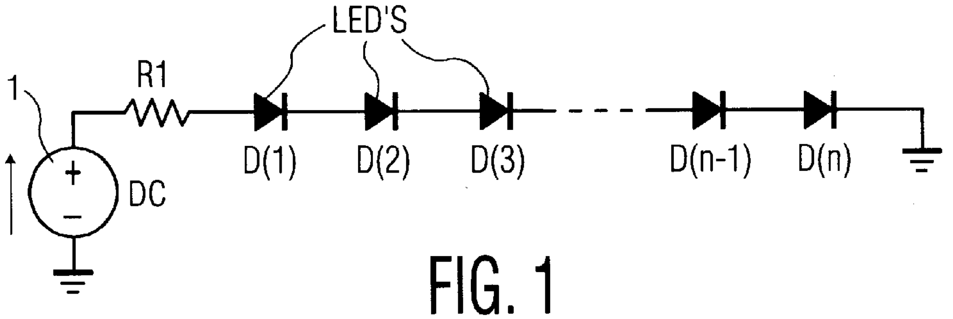
FIG. 1 PRIOR ART
FIG. 1 shows a known serial arrangement of light-emitting diodes.
Figure 2A:
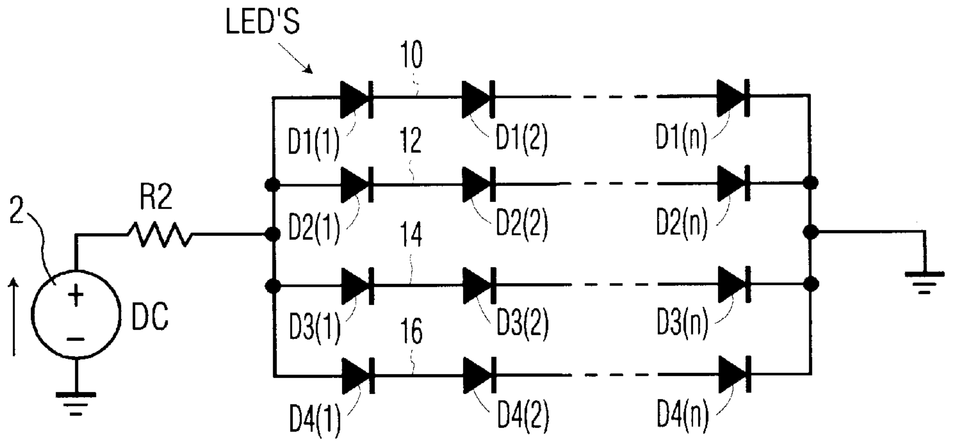
FIG. 2A PRIOR ART
Figure 2B:
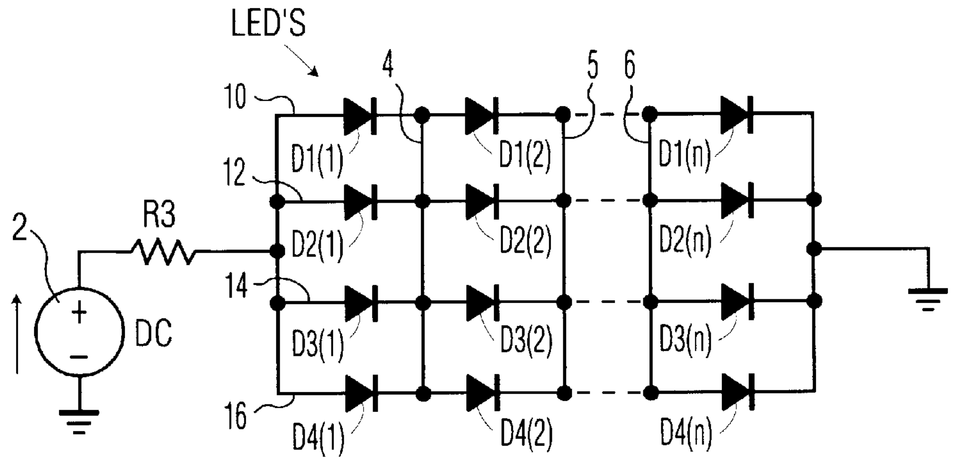
FIG. 2B PRIOR ART
FIG. 2B shows the arrangement of FIG. 1 with shunts interconnecting the serial branches.
Figure 3A:
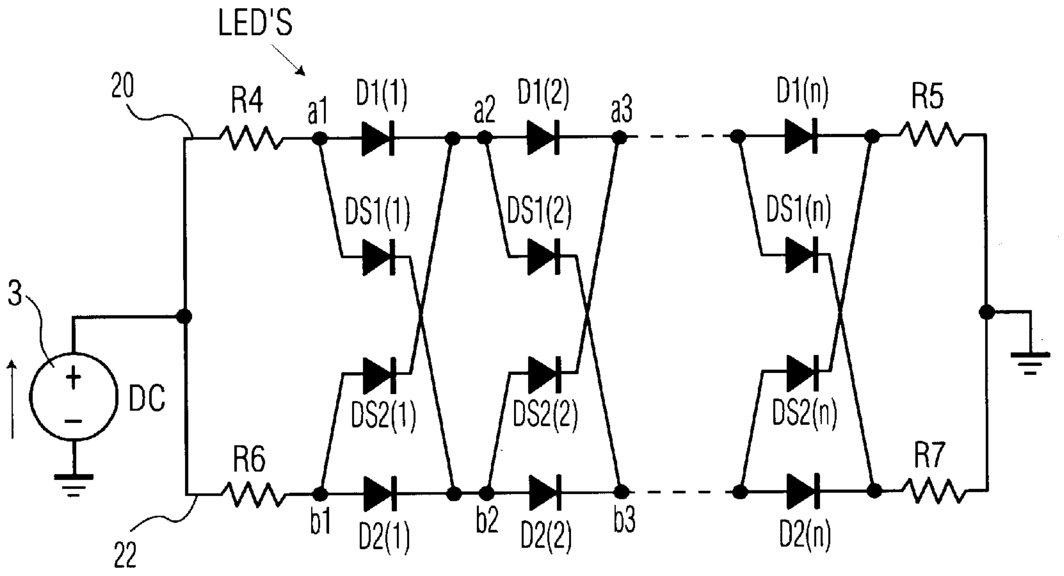
Figure 3B:
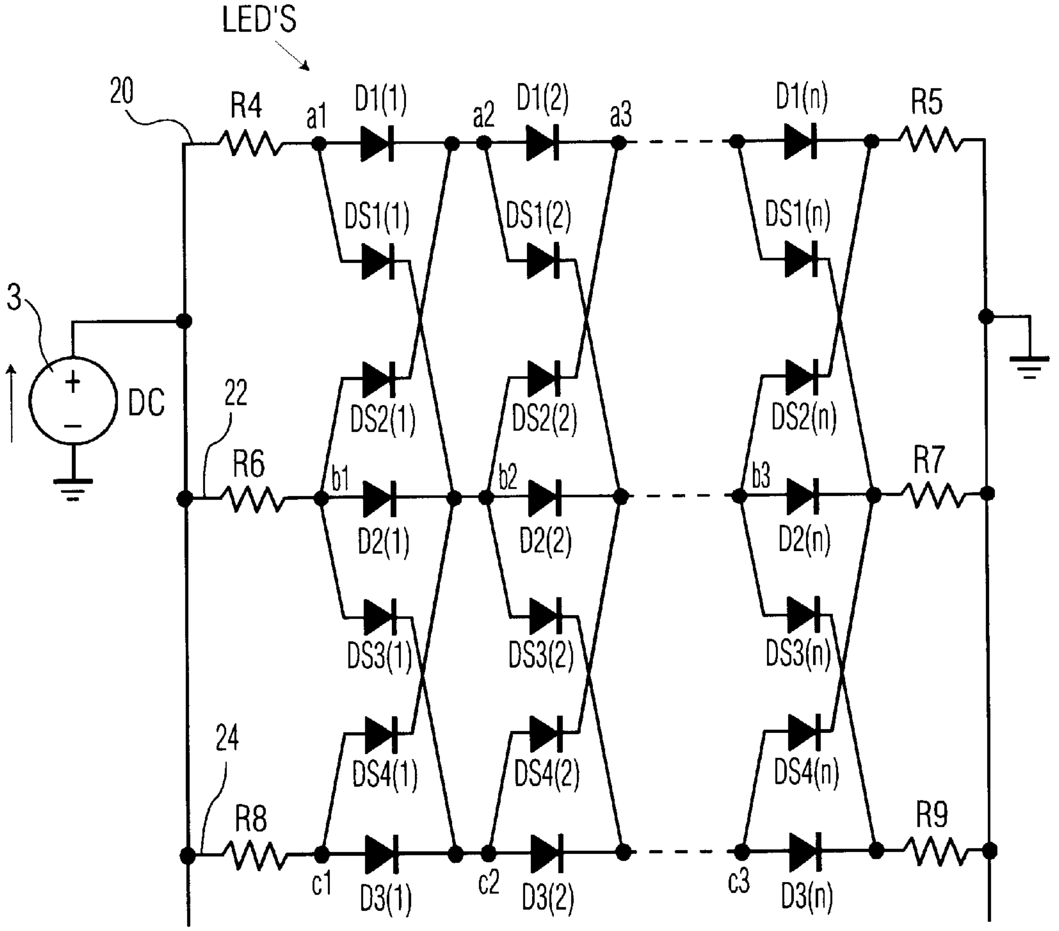
FIG. 3B shows the arrangement of FIG. 3A extended to additional branches.
Figure 4A:
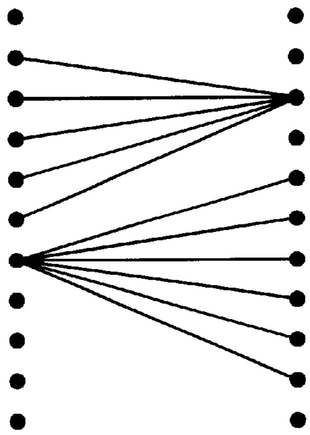
Figure 4B:
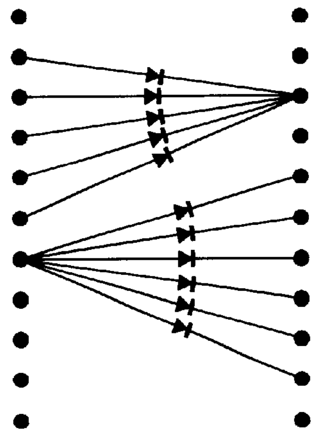
FIG. 4B shows the schematic representation of FIG. 4A with the relations replaced by light-emitting diodes.
Figure 6:
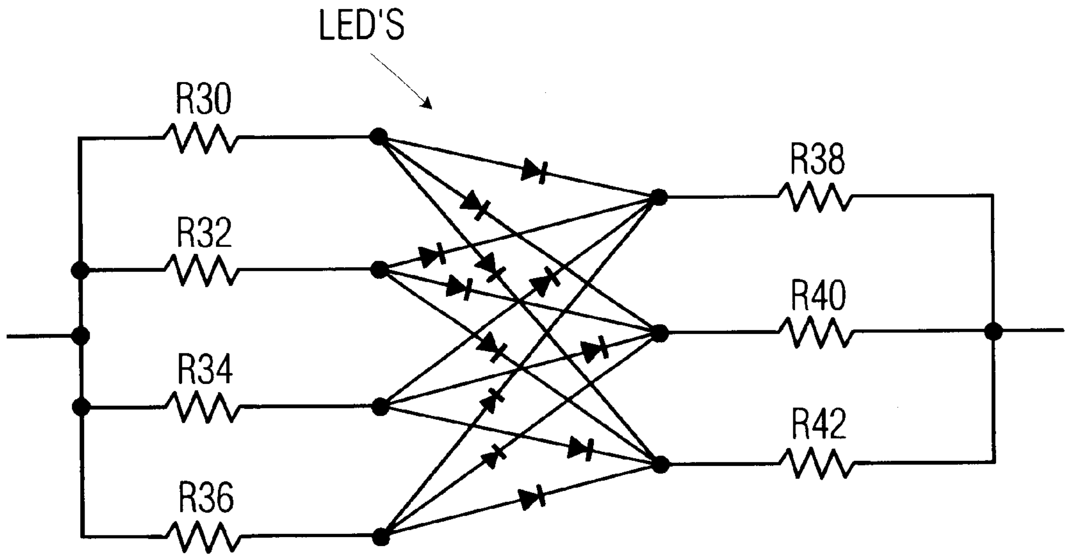
FIG. 6 shows a second embodiment of the subject invention in which the number of input nodes is greater than the number of output nodes.

As suggested by the diagram in FIG. 4B, the principle of the subject invention may be extended to the situation where the number of input nodes is unequal to the number of output nodes. In particular, FIG. 6 shows an embodiment where there are 4 input nodes, shown as resistors R30, R32, R34 and R36, while there are 3 output nodes, shown as resistors R38, R40 and R42. Similarly as in FIG. 5, LED's connect each of the resistors R30, R32, R34 and R36 to each of the resistors R38, R40 and R42. Again, no two light-emitting diodes is connected in parallel.

Figure 7:
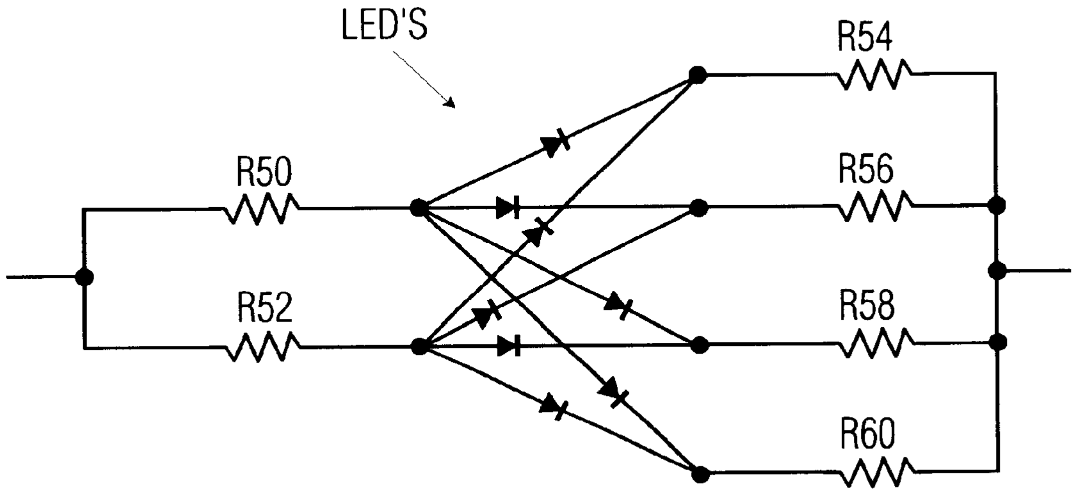
FIG. 7 shows a third embodiment of the subject invention in which the number of input nodes is smaller than the number of output nodes.

FIG. 7 shows another embodiment where there are 2 input nodes, shown as resistors R50 and R52, and 4 output nodes, shown as R54, R56, R58 and R60. Again, similarly as in FIG. 5, LED's connect each of the resistors R50 and R52 to each of the resistors R54, R56, R58 and R60. As with the embodiments of FIGS. 5 and 6, no two light-emitting diodes is connected in parallel.

Figure 8:
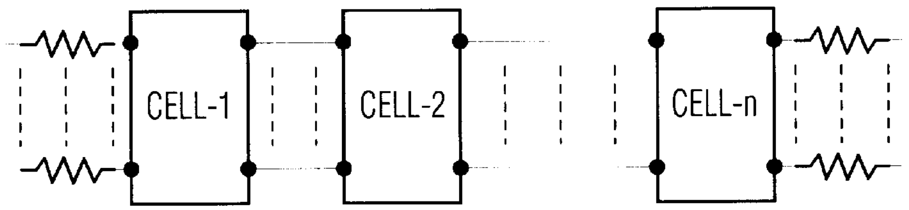
FIG. 8 shows a plurality of cells of light-emitting diodes arranged in series.
Figure 9:
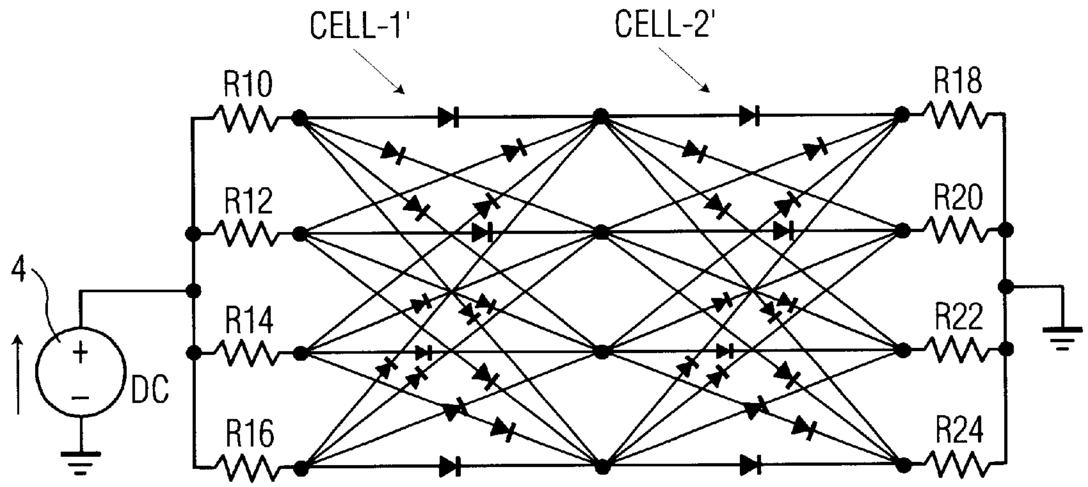
FIG. 9 shows the arrangement of FIG. 8 using the embodiment of FIG. 5.

While the embodiments of FIGS. 5–7 each show a cell of light-emitting diodes having a width of one light-emitting diode, a plurality of these cells may be serially connected together, as diagrammatically shown in FIG. 8. The only provision is that the number of output terminals of one cell, for example, CELL-1, must equal the number of input terminals of a following cell, for example, CELL-2. FIG. 9 shows an extension of the embodiment of FIG. 5 in which two of the light-emitting diode cells of FIG. 5, indicated as CELL-1' and CELL-2' are serially arranged. It should be noted that the output resistors of CELL-1' and the input resistors of CELL-2' are not needed.

Figure 10:
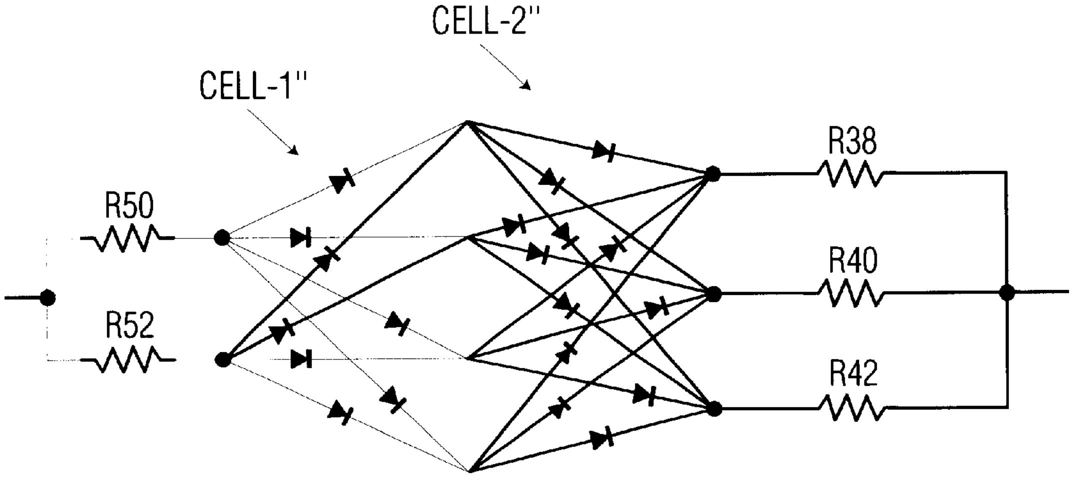
FIG. 10 shows the arrangement of FIG. 8 using the embodiments of FIGS. 6 and 7.

FIG. 10 shows and extension of FIGS. 6 and 7, in which CELL-1" is the light-emitting diode cell of FIG. 7 while CELL-2" is the light-emitting diode cell of FIG. 6.

Numerous alterations and modifications of the structure herein disclosed will present themselves to those skilled in the art. However, it is to be understood that the above described embodiment is for purposes of illustration only and not to be construed as a limitation of the invention. All such modifications which do not depart from the spirit of the invention are intended to be included within the scope of the appended claims.

What is claimed is:

1. A matrix structure based light-emitting diode array for illumination comprising:

an input terminal coupled to a first terminal of a current source for receiving a current signal;

an output terminal coupled to a second terminal of said current source;

a plurality of input current regulating elements coupled in parallel to said input terminal;

a plurality of output current regulating elements coupled in parallel to said output terminal; and a plurality of light-emitting diodes connecting each input current regulating element to each output current regulating element, whereby none of the light-emitting diodes are connected in parallel.

2. The matrix structure-based light-emitting diode array as claimed in claim 1, wherein each of said light-emitting diodes has an anode connected to one of said plurality of input current regulating elements, and a cathode connected to one of said plurality of output current regulating elements.

3. The matrix structure-based light-emitting diode array as claimed in claim 1, wherein the plurality of input current regulating elements equals, in number, the plurality of output current regulating elements.

4. The matrix structure-based light-emitting diode array as claimed in claim 1, wherein the plurality of input current regulating elements is greater, in number, than said plurality of output current regulating elements.

5. The matrix structure-based light-emitting diode array as claimed in claim 1, wherein the plurality of input current regulating elements is smaller, in number, than the plurality of output current regulating elements.

6. The matrix structure-based light-emitting diode array as claimed in claim 1, wherein said plurality of input and output current regulating elements are resistors.

7. A light-emitting diode arrangement comprising:

an input terminal coupled to a first terminal of a current source for receiving a current signal;

an output terminal coupled to a second terminal of said current source;

a plurality of input current regulating elements coupled in parallel to said input terminal;

a plurality of output current regulating elements coupled in parallel to said output terminal; and a plurality of matrix structure-based light-emitting diode arrays serially arranged between said plurality of input and output current regulating elements, each of said matrix structure-based light-emitting diode arrays comprising a plurality of light-emitting diodes connecting each input node of said array to each output node of said array, wherein the number of output nodes in any one of said arrays is equal to the number of input nodes in a following one of said arrays, and wherein the number of input nodes in a first array of said serially arranged plurality of matrix structure-based light-emitting diode arrays is equal to the number of said plurality of input current regulating elements, and the number of output nodes in a last array of said serially arranged plurality of matrix structure-based light-emitting diode arrays is equal to the number of said plurality of output current regulating elements.

8. The light-emitting diode arrangement as claimed in claim 7, wherein the plurality of input current regulating elements equals, in number, the plurality of output current regulating elements.

9. The light-emitting diode arrangement as claimed in claim 7, wherein the plurality of input current regulating elements is greater, in number, than said plurality of output current regulating elements.

10. The light-emitting diode arrangement as claimed in claim 7, wherein the plurality of input current regulating elements is smaller, in number, than the plurality of output current regulating elements.

11. The light-emitting diode arrangement as claimed in claim 7, wherein said plurality of input and output current regulating elements are resistors.

* * * * *